(12) United States Patent
Ezure (10) Patent No.: US 12,481,075 B2
(45) Date of Patent: Nov. 25, 2025

(54) RADIATION IMAGING APPARATUS, RADIATION IMAGING SYSTEM, AND METHOD OF CONTROLLING RADIATION IMAGING APPARATUS

(71) Applicant: CANON KABUSHIKI KAISHA, Tokyo (JP)

(72) Inventor: Ryo Ezure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 18/056,641

(22) Filed: Nov. 17, 2022

(65) Prior Publication Data

US 2023/0168392 A1  Jun. 1, 2023

(30) Foreign Application Priority Data

Nov. 26, 2021  (JP) ................................. 2021-192187

(51) Int. Cl.
  *G01T 1/17*  (2006.01)
  *H04N 23/71*  (2023.01)
(52) U.S. Cl.
  CPC ............... *G01T 1/17* (2013.01); *H04N 23/71* (2023.01)
(58) Field of Classification Search
  CPC .................................. G01T 1/17; H04N 23/71
  See application file for complete search history.

(56) References Cited

U.S. PATENT DOCUMENTS

| | | | | |
|---|---|---|---|---|
| 3,949,229 A | * | 4/1976 | Albert ................. | A61B 6/4028 378/143 |
| 4,573,183 A | * | 2/1986 | Relihan ................ | H05G 1/36 378/98.7 |
| 4,590,603 A | * | 5/1986 | Relihan ................ | H05G 1/46 378/108 |
| 4,703,496 A | * | 10/1987 | Meccariello ......... | H04N 5/32 378/114 |

(Continued)

FOREIGN PATENT DOCUMENTS

| | | |
|---|---|---|
| JP | 2001340321 A | 12/2001 |
| JP | 2004362876 A | 12/2004 |

*Primary Examiner* — Blake C Riddick
(74) *Attorney, Agent, or Firm* — Canon U.S.A., Inc. IP Divsion (57) ABSTRACT

A radiation imaging apparatus includes a pixel unit including a plurality of pixels and configured to generate image data according to received irradiation of radiation from a radiation generation apparatus, and a control unit configured to acquire irradiation information regarding a radiation irradiation area or an irradiation position of the pixel unit, calculate brightness information of each of successive pieces of image data provided by the pixel unit based on the image data and the irradiation information, generate irradiation condition information of the radiation generation apparatus based on the brightness information, and transmit the irradiation condition information to the radiation generation apparatus. The control unit recalculates the brightness information when a fluctuation of the brightness information exceeds a threshold value. The control unit does not transmit (Continued)

irradiation condition information based on the recalculated brightness information to the radiation generation apparatus until a predetermined period of time elapses since the recalculation.

6 Claims, 9 Drawing Sheets

(56) References Cited

U.S. PATENT DOCUMENTS

| | | | | |
|---|---|---|---|---|
| 4,847,765 | A * | 7/1989 | Nonnweiler | H05G 1/30 700/1 |
| 5,012,504 | A * | 4/1991 | McFaul | H04N 23/30 378/112 |
| 5,636,259 | A * | 6/1997 | Khutoryansky | A61B 6/4283 378/197 |
| 5,870,450 | A * | 2/1999 | Khutoryansky | A61B 6/548 378/197 |
| 5,917,882 | A * | 6/1999 | Khutoryansky | H05G 1/58 378/98.2 |
| 2007/0071299 | A1* | 3/2007 | Matsuura | G06T 11/005 382/128 |
| 2009/0129679 | A1* | 5/2009 | Miyamoto | G06V 10/507 382/190 |
| 2009/0279665 | A1* | 11/2009 | Takahashi | A61B 6/542 378/62 |
| 2010/0111256 | A1* | 5/2010 | Hayashida | G01N 23/046 378/87 |
| 2012/0300904 | A1* | 11/2012 | Shimada | A61B 6/463 378/62 |
| 2013/0011021 | A1* | 1/2013 | Machida | G06T 7/11 382/107 |
| 2013/0182822 | A1* | 7/2013 | Sakaguchi | A61B 6/503 378/42 |
| 2013/0279657 | A1* | 10/2013 | Hiroike | H05G 1/08 378/91 |
| 2013/0336456 | A1* | 12/2013 | Tanaka | A61B 6/548 378/91 |
| 2014/0029722 | A1* | 1/2014 | Matsumoto | A61B 6/4441 378/62 |
| 2014/0098939 | A1* | 4/2014 | Yamanaka | A61B 6/4405 378/102 |
| 2014/0140606 | A1* | 5/2014 | Temmei | G06T 7/0012 382/132 |
| 2014/0198131 | A1* | 7/2014 | Rudin | A61B 6/12 345/634 |
| 2014/0205066 | A1* | 7/2014 | Kitagawa | H04N 5/32 378/62 |
| 2014/0241499 | A1* | 8/2014 | Tsuchiya | A61B 6/4283 378/62 |
| 2014/0254758 | A1* | 9/2014 | Saigusa | A61B 6/548 378/62 |
| 2014/0316236 | A1* | 10/2014 | Umezawa | A61B 5/1128 600/407 |
| 2014/0341350 | A1* | 11/2014 | Muroi | A61B 6/504 378/62 |
| 2015/0071406 | A1* | 3/2015 | Temmei | G06T 7/11 378/62 |
| 2015/0085975 | A1* | 3/2015 | Kato | G16H 50/20 382/132 |
| 2015/0139382 | A1* | 5/2015 | Hyung | A61B 6/06 378/5 |
| 2015/0317771 | A1* | 11/2015 | Kato | G06T 5/10 378/62 |
| 2016/0029989 | A1* | 2/2016 | Nagae | A61B 6/487 378/42 |
| 2016/0029992 | A1* | 2/2016 | Iijima | A61B 6/547 378/62 |
| 2016/0038114 | A1* | 2/2016 | Tajima | A61B 6/5294 378/97 |
| 2016/0206274 | A1* | 7/2016 | Kang | A61B 6/4035 |
| 2018/0333124 | A1* | 11/2018 | Kaneko | A61B 6/542 |
| 2019/0221013 | A1* | 7/2019 | Fukuda | G06T 5/70 |
| 2019/0328345 | A1* | 10/2019 | Ohashi | A61B 6/5235 |
| 2020/0120783 | A1* | 4/2020 | Kuwata | A61B 6/542 |
| 2020/0205767 | A1* | 7/2020 | Niwa | A61B 6/487 |
| 2020/0292474 | A1* | 9/2020 | Hayashida | G01N 23/04 |
| 2021/0204901 | A1* | 7/2021 | Matsuda | A61B 6/545 |
| 2021/0378615 | A1* | 12/2021 | Kitano | A61B 6/545 |
| 2021/0378617 | A1* | 12/2021 | Kitano | A61B 6/5258 |
| 2021/0378622 | A1* | 12/2021 | Kitano | A61B 6/544 |
| 2021/0383514 | A1* | 12/2021 | Kitano | A61B 6/487 |
| 2021/0383542 | A1* | 12/2021 | Kitano | A61B 6/0492 |
| 2022/0133258 | A1* | 5/2022 | Yin | A61B 6/542 378/97 |
| 2022/0256103 | A1* | 8/2022 | Kuwata | A61B 6/5241 |

* cited by examiner

RADIATION IMAGING APPARATUS, RADIATION IMAGING SYSTEM, AND METHOD OF CONTROLLING RADIATION IMAGING APPARATUS

BACKGROUND

Field of Disclosure

The present disclosure relates to a radiation imaging apparatus, a radiation imaging system, and a method of controlling the radiation imaging apparatus.

Description of Related Art

Some radiation imaging apparatuses and radiation imaging systems available in the market have a capability of obtaining a clear radiation image. To that end, a subject is irradiated with radiation emitted by a radiation generation apparatus, a radiation intensity distribution of radiation passed through the subject is obtained and digitized, and image processing is performed on the digitized radiation image, thereby obtaining the clear radiation image. Such a radiation imaging apparatus generally has an automatic brightness control function (hereinafter referred to as ABC). The ABC is a technique of maintaining the image brightness at a substantially constant level by controlling the average value or weighted average value of pixel values in a region of interest (hereinafter referred to as a ROI) in a radiation image so as to be close or equal to a target value. More specifically, in the ABC, the condition of the radiation generated in next and subsequent frames are changed according to the average value in the ROI, and the radiation generation apparatus is feedback-controlled according to the new condition.

In order to limit the irradiation field on a subject, the radiation generation apparatus that emits radiation has a collimator unit having a plurality of openable and closable collimator leaves. An operator adjusts the degree of opening of the collimator in the collimator unit for each part of the subject under observation to reduce the radiation exposure dose.

Japanese Patent Application Laid-Open No. 2001-340321 discloses a technique in which change information indicating a change in the irradiation field made by the collimator unit is received from the radiation generation apparatus, and when it is determined from the received change information that part of the ROI is covered with a collimator leaf as a result of the change in the irradiation field, the ROI is changed thereby achieving the ABC which is robust to fluctuations of the irradiation field.

Japanese Patent Application Laid-Open No. 2004-362876 discloses a technique in which change information indicating a change in the irradiation field made by the collimator unit is received from the radiation generation apparatus, and the radiation condition is corrected according to the received change information thereby achieving the ABC which is robust to fluctuations of the irradiation field.

In the techniques disclosed in Japanese Patent Application Laid-Open No. 2001-340321 and Japanese Patent Application Laid-Open No. 2004-362876, there is a possibility that the ABC operation may not be performed adequately when a delay occurs in a notification of irradiation change information from the radiation generation apparatus. Therefore, the techniques disclosed in Japanese Patent Application Laid-Open No. 2001-340321 and Japanese Patent Application Laid-Open No. 2004-362876 need further improvement in the ABC operation performed when the irradiation field is changed by the collimator to obtain a radiation image with appropriate brightness.

SUMMARY OF THE DISCLOSURE

In an aspect, the present disclosure provides a radiation imaging apparatus including a pixel unit including a plurality of pixels and configured to generate image data in response to receiving irradiation of radiation from a radiation generation apparatus, and a control unit configured to acquire irradiation information regarding a radiation irradiation area or an irradiation position of the pixel unit irradiated by the radiation generation apparatus, calculate brightness information of each of successive pieces of image data obtained by operating the pixel unit at a predetermined frame rate based on each of the successive pieces of image data and the irradiation information, generate irradiation condition information regarding an irradiation condition of the radiation generation apparatus based on the brightness information, and transmit the irradiation condition information to the radiation generation apparatus, wherein the control unit recalculates the brightness information based on the irradiation information when a fluctuation of the brightness information exceeds a threshold value, and the control unit does not transmit irradiation condition information based on the recalculated brightness information to the radiation generation apparatus until a predetermined period of time elapses since the recalculation.

Further features of the present disclosure will become apparent from the following description of exemplary embodiments with reference to the attached drawings.

DESCRIPTION OF THE EMBODIMENTS

First Embodiment

Embodiments of the present disclosure are described below with reference to the accompanying drawings.

The present disclosure provides an improved technique of adequately performing the ABC operation even when a delay in the notification of irradiation change information from the radiation generation apparatus occurs. First, the ABC operation and certain causes for a delay in the notification are described.

In a system in which irradiation field change information from a radiation generation apparatus is received via a network, there is a possibility that a delay occurs in arrival of a notification of the irradiation field change information from the radiation generation apparatus.

When fluoroscopic imaging or continuous imaging is started, and ABC operates and the radiation condition has become stable, if an irradiation field reduction occurs as a result of a control by an operator on the collimator unit, and if a delay occurs in a notification of the irradiation field change information, an unintended inadequate control occurs in the ABC operation. More specifically, when the irradiation field is reduced at a time t1 in FIG. 3 by controlling the collimator unit such that the irradiation field is changed from a state shown in FIG. 4A to a state shown in FIG. 4B, if the notification of the information indicating this change in the irradiation field (hereinafter also referred to as irradiation field change information) is delayed, the ABC calculates the pixel average value in the ROI without changing the ROI. In FIGS. 4A and 4B, 200 denotes the radiation detection unit, 201 and 204 each denote a radiation irradiation region, 202 and 205 each denote a region which is not irradiated with radiation, and 203 denotes the ROI.

However, the irradiation field reduction causes the ROI 203 to include the region 205 which is not irradiated with radiation as shown in FIG. 4B, and thus a reduction occurs in the pixel average value in the ROI. As a result, the pixel average value in the ROI 203 becomes lower than the target value, and it is determined that the amount of radiation is low. Therefore, the ABC sets the radiation irradiation condition such that the amount of radiation is greater than in the previous frame and the radiation generation apparatus is feedback-controlled according to the new condition. As a result, after the irradiation field reduction occurs, the feedback control causes an increase in the amount of radiation until the pixel average value in the ROI becomes substantially equal to the target value.

Figure 5A:
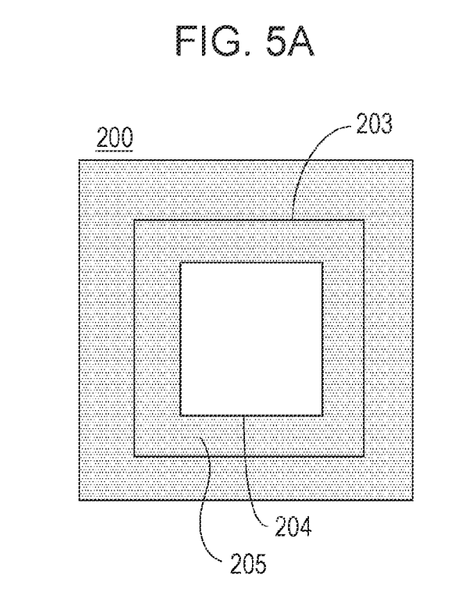
FIGS. 5A and 5B are diagrams showing a change in the irradiation area of a radiation detection unit which occurs when an irradiation field reduction occurs and a notification of irradiation field change information is delayed.
Figure 5B:
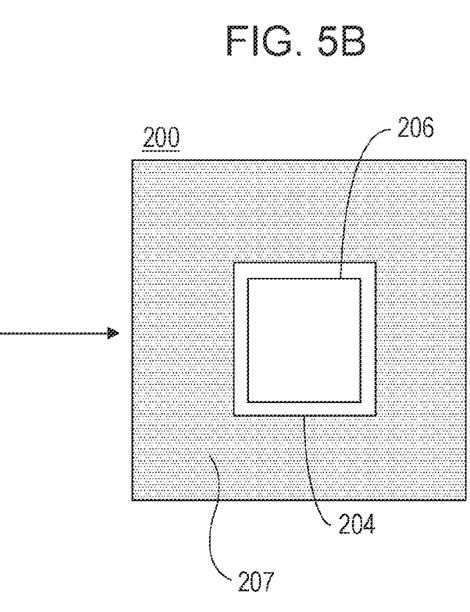

After that, when the irradiation field change information is received at a time t2 and the ROI is changed from the ROI 203 shown in FIG. 5A to the ROI 206 shown in FIG. 5B, the entire ROI 206 is irradiated with the radiation, and thus the pixel average value becomes higher than the target value. In FIGS. 5A and 5B, 200 denotes the radiation detection unit, 204 denotes the radiation irradiation region, 205 and 207 each denote a region which is not irradiated with radiation, and 206 denotes the ROI. Since the pixel average value in the ROI 206 is greater than the target value, it is determined that the amount of radiation is too large, and the ABC sets the radiation irradiation condition such that the amount of radiation is smaller than that in the previous frame and the radiation generation apparatus is feedback-controlled according to the new condition. Thus, after the irradiation field change information is received, the feedback control is performed so as to reduce the amount of radiation until the pixel average value in the ROI 206 becomes substantially equal to the target value.

Figure 3:
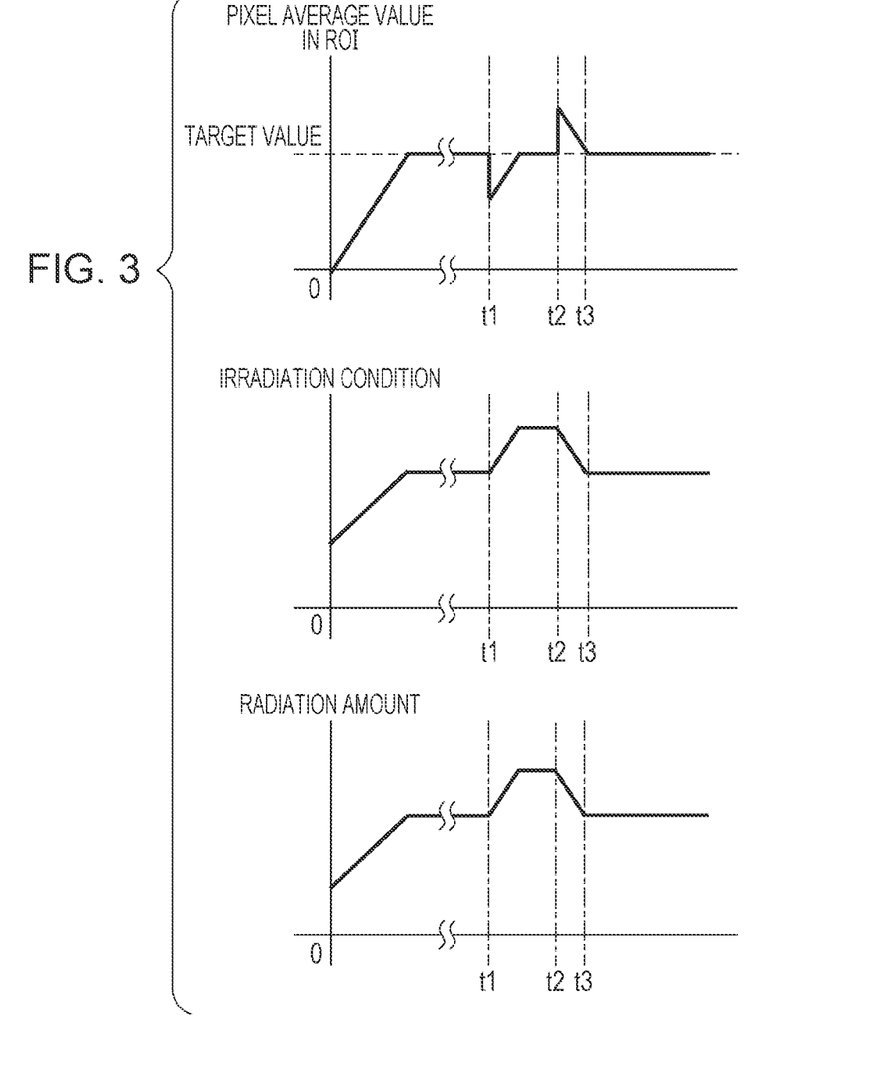
FIG. 3 illustrates temporal changes in pixel average value in ROI, an irradiation condition, and an amount of radiation which occur when a irradiation field reduction occurs in the middle of fluoroscopic imaging or continuous imaging if a delay occurs in a notification of irradiation field change information.
Figure 4A:
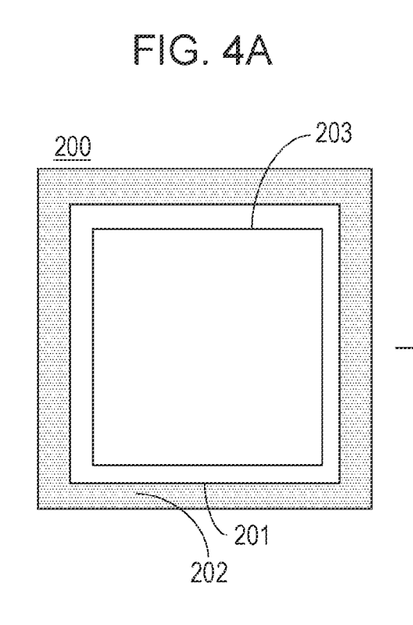
FIGS. 4A and 4B are diagrams showing a change in the area of a radiation detection unit which occurs when an irradiation field reduction occurs but there is no notification of irradiation field change information.
Figure 4B:
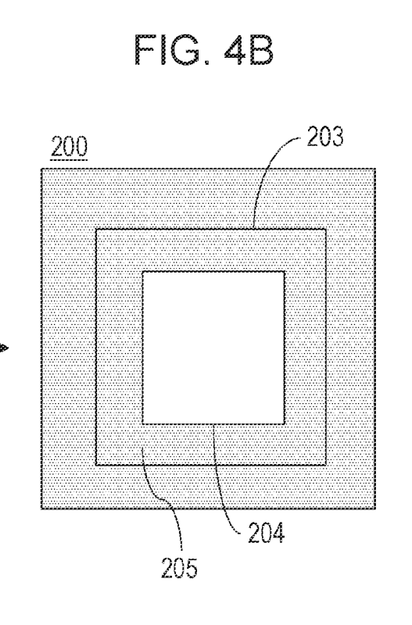

As described above, in the fluoroscopic imaging or continuous imaging, when the radiation condition has become stable, if an irradiation field reduction occurs as a result of controlling the collimator unit, and if a delay occurs in a notification of the irradiation field change information, the ABC is not performed in an intended adequate manner during the period from t1 to t3 in FIG. 3. As a result, the image acquired during this period becomes unintentionally bright, which may cause the image to be unusable in diagnosis, and thus result in ineffective exposure. This may result in an increase in the exposure dose to a patient.

In view of the above, the present disclosure provides a technique of suppressing a reduction in ABC accuracy in a radiation imaging apparatus when an irradiation field reduction occurs as a result of controlling a collimator unit in the middle of radiation imaging, even if a delay occurs in a notification of irradiation field change information thereof.

Embodiments of the present disclosure are described below with reference to the accompanying drawings.

In the following description of the embodiments of the present disclosure, acquisition of a plurality of consecutive radiation images will be described taking, as an example, X-ray fluoroscopic imaging, but the techniques disclosed here are also applicable to continuous X-ray radiation imaging.

Figure 1:
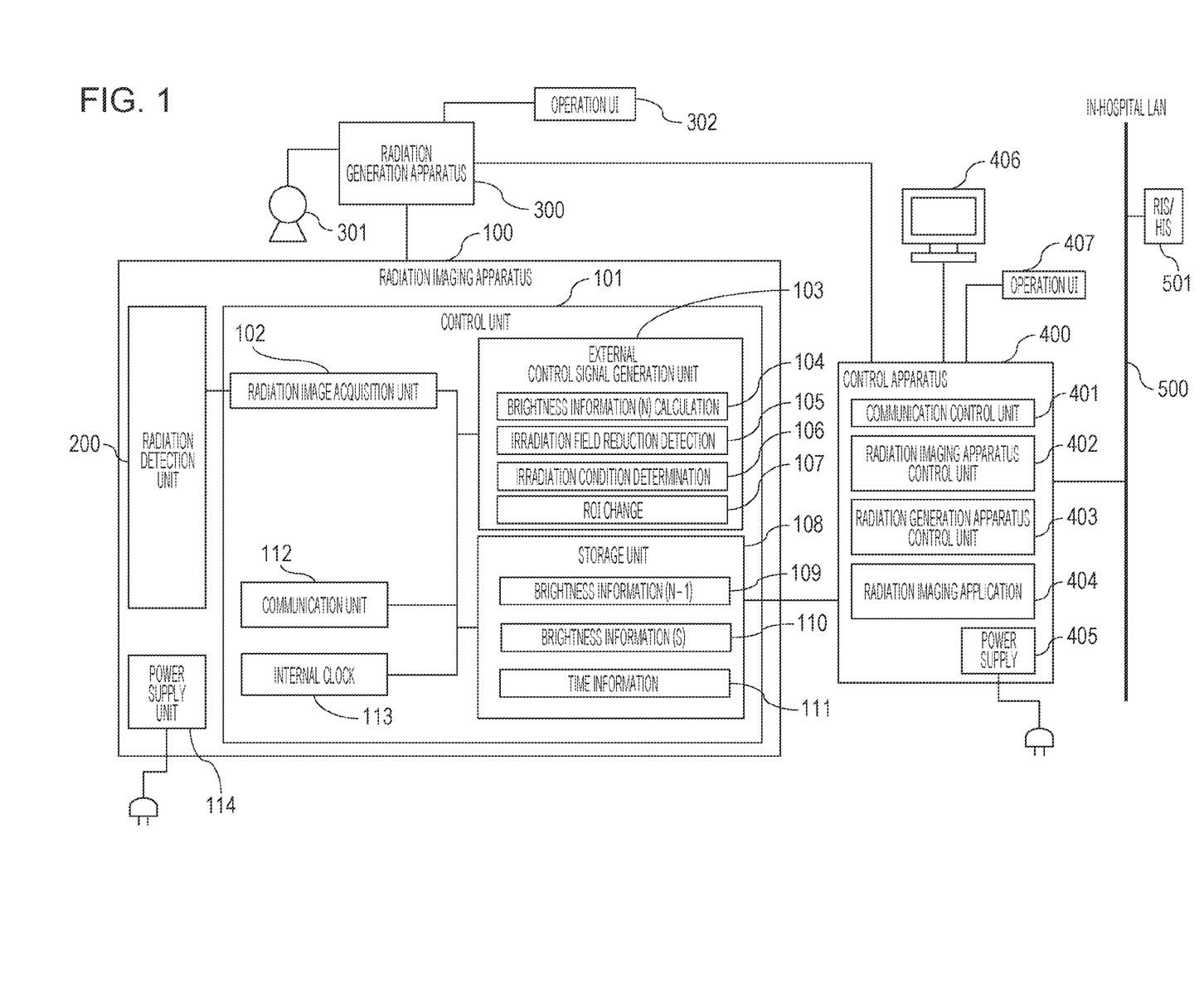
FIG. 1 is a diagram illustrating an example of a configuration of a radiation imaging system.

FIG. 1 illustrates an example of a configuration of a radiation imaging system. This system includes a radiation imaging apparatus 100 including a radiation detection unit 200, a radiation source 301 that emits radiation, and a radiation generation apparatus 300 that controls the radiation source 301. The system further includes a control apparatus 400 that controls the radiation imaging apparatus 100 and the radiation generation apparatus 300, wherein the control apparatus 400 includes a radiation imaging application 404 capable of collecting images from the radiation imaging application, displaying the collected images, accepting an imaging order, and registering imaging information. In the present embodiment, although the radiation source 301 is disposed separately from the radiation generation apparatus 300, the radiation source 301 and the radiation generation apparatus 300 may be integrated into a single apparatus. In this case, the radiation source 301 and the radiation generation apparatus 300 constitute a radiation generation apparatus. The control apparatus 400 is connected to an in-hospital network realized by, for example, a LAN (Local Area Network). In addition, a RIS (Radiology Information System) 501 or a HIS (Hospital Information System) is also connected to the in-hospital network. The control apparatus 400 and the RIS 501 can communicate with each other to transmit/receive various information such as an imaging order to capture a radiation image, imaging information including, for example, patient information, image data itself obtained via imaging, and the like.

The radiation imaging apparatus 100 includes a radiation detection unit 200 that detects radiation and generates image data, a control unit 101 that performs imaging and communication, and a power supply unit 114. The radiation detection unit 200 includes an image sensor device such as a flat panel detector (FPD) including two-dimensionally distributed pixels capable of detecting a two-dimensional distribution of radiation incident on the radiation detection unit 200 and generating radiation image data. Note that hereinafter the radiation detection unit 200 may also be referred to as a pixel unit.

The control unit 101 includes a radiation image acquisition unit 102 that acquires a radiation image from the radiation detection unit 200, an external control signal generation unit 103, a storage unit 108, a communication unit 112, and an internal clock 113.

The external control signal generation unit 103 performs, based on the radiation image acquired by the radiation image acquisition unit 102, brightness information calculation 104, an irradiation field reduction detection 105, and an irradiation condition determination 106, and performs a ROI change 107 according to the irradiation field change information sent from the radiation imaging apparatus control unit 402. Here, the brightness information calculation 104, the irradiation field reduction detection 105, the irradiation condition determination 106, and the ROI change 107 are each an operation executed by external control signal generation unit 103.

The storage unit 108 stores the brightness information (N-1) 109 calculated by the external control signal generation unit 103, the brightness information (S) 110 of a frame immediately before a frame generated when the irradiation field reduction is detected, and time information 111 which is information of the internal clock 113 at the time when the irradiation field reduction is detected. Here, the brightness information (N-1) 109, the brightness information (S) 110, and the time information 111 each are information (data).

The radiation generation apparatus 300 and the radiation imaging apparatus 100 are capable of transmitting/receiving information between each other via a dedicated signal line. Information or signals exchanged between the radiation generation apparatus 300 and the radiation imaging apparatus 100 include, for example, synchronization signals such as a radiation irradiation start signal, an end notification signal, a notification of allowable timing of radiation irradiation, etc., and irradiation condition information indicating an irradiation condition determined by the external control signal generation unit 103. The radiation generation apparatus 300 may send, to the radiation imaging apparatus 100, a notification of irradiation area information, irradiation position information, and/or the like as irradiation information.

The control apparatus 400 includes a radiation imaging apparatus control unit 402 that controls the radiation imaging apparatus 100 in terms of the image acquisition timing and other conditions, and a radiation generation apparatus control unit 403 that controls the radiation generation apparatus 300 in terms of the radiation irradiation condition and/or the like. The control apparatus 400 further includes a communication control unit 401 that controls the communication with the radiation imaging apparatus and the radiation generation apparatus, and the communication with the in-hospital LAN, and also includes the radiation imaging application 404 described above. The control apparatus 400 also includes a display unit 406 for displaying a captured image and imaging information, and a control apparatus operation UI (a keyboard, a mouse, etc.) 407 for operating the radiation imaging application. The control apparatus 400 and the radiation imaging apparatus 100 are connected, and also the control apparatus 400 and the radiation generation apparatus 300 are connected, via communication cables according to standards such as RS232C, USB, Ethernet, and/or the like, dedicated signal lines, wireless communication channels, or the like such that information is exchanged between them. Note that a plurality of communication means may be used to exchange information. The control apparatus 400 and the radiation imaging apparatus 100 performs control communication with each other in terms of, for example, image data, image acquisition condition setting, apparatus status acquisition, a notification of irradiation field information received from the radiation generation apparatus 300, and the like. The control apparatus 400 and the radiation generation apparatus 300 performs control communication with each other in terms of, for example, radiation irradiation condition setting, apparatus status acquisition, actual irradiation information, irradiation field information, and the like.

Although not shown in the figures, the radiation source 301 includes one or more movable collimator leaves such that the irradiation field can be changed by moving the collimator according to a control signal provided from the radiation generation apparatus 300. According to the operation performed by an operator on the radiation generation apparatus operation UI 302, the radiation generation apparatus 300 generates a control signal for controlling the movable collimator leaves.

When an irradiation field change occurs in the radiation generation apparatus 300, the radiation generation apparatus 300 notifies the control apparatus 400 of this fact. If necessary, the control apparatus 400 processes the information received from the radiation generation apparatus 300 by using the radiation imaging apparatus control unit 402, and sends the result as irradiation field change information to the radiation imaging apparatus 100 via the communication control unit 401. A notification of irradiation information such as irradiation field change information or irradiation field information, and a notification of irradiation condition information such as radiation irradiation condition information are not limited to those sent via the control unit 400, but notifications may be sent directly between the radiation imaging apparatus 100 and the radiation generation apparatus 300.

Figure 2A:
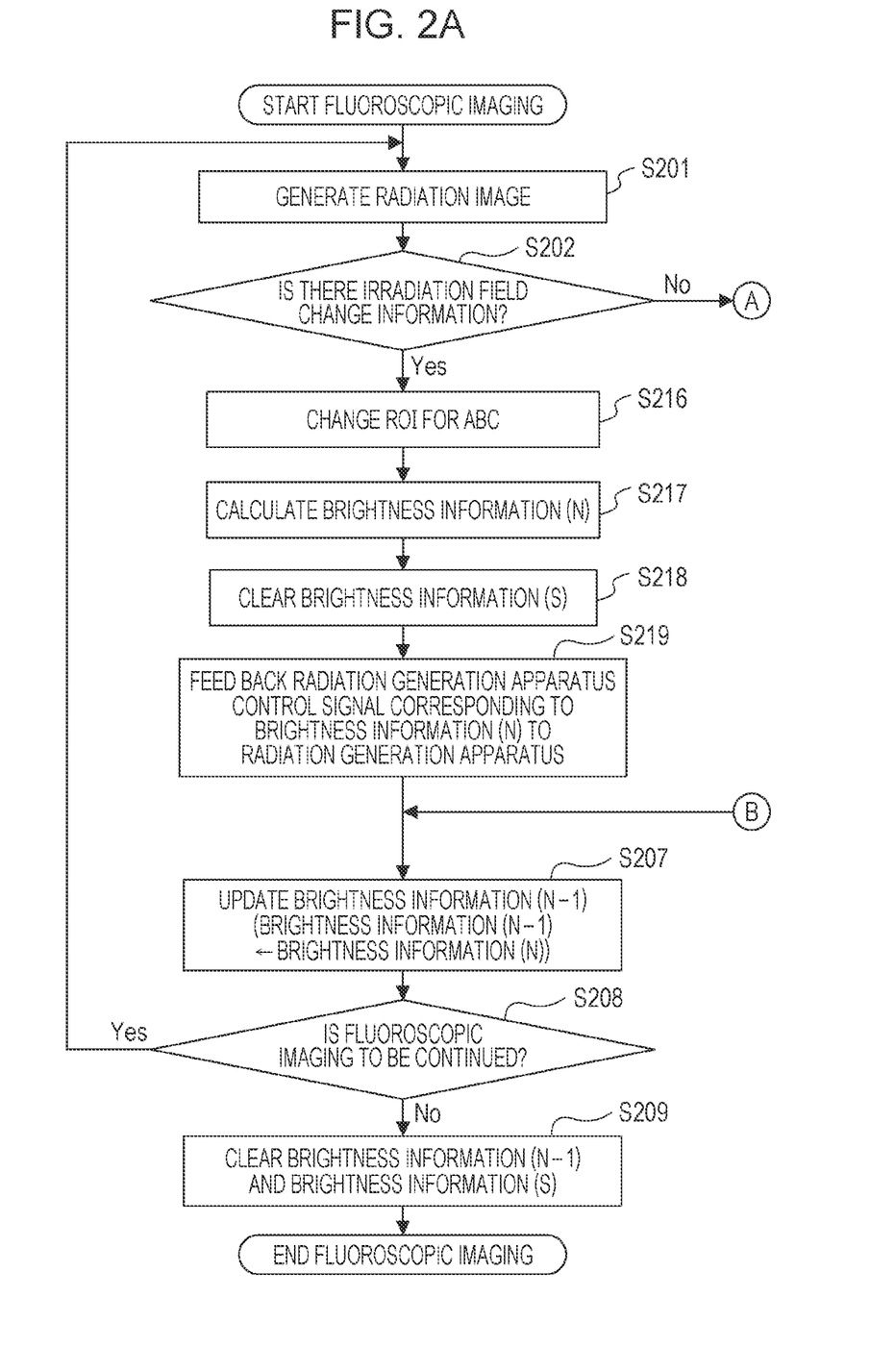
FIGS. 2A and 2B each are a part of a flowchart illustrating a flow of control by ABC according to an embodiment of the present disclosure.

The description is continued below referring to also a flowchart shown in FIGS. 2A and 2B. Although not shown in FIGS. 2A and 2B, the operator first selects patient information, a fluoroscopic imaging target part, and an imaging method by using the control apparatus operation UI 407. According to the selection by the operator, the radiation imaging apparatus control unit 402 generates a radiation imaging apparatus control signal (for specifying, for example, an imaging mode number indicating an imaging mode in which a frame rate, an image size, and the like are determined in advance, ROI position information used in calculating ABC brightness information, and the like). The generated radiation imaging apparatus control signal is sent from the communication control unit 401 to the communication unit 112 of the radiation imaging apparatus 100. The control unit 101 receives the radiation imaging apparatus control signal from the communication unit 112, and, in the fluoroscopic imaging operation, the control unit 101 controls the radiation image acquisition unit 102 repeatedly at intervals corresponding to the frame rate of the radiation imaging apparatus control signal so as to acquire a radiation image from the radiation detection unit 200.

Furthermore, the radiation generation apparatus control unit 403 generates a radiation generation apparatus control signal (for controlling, for example, a tube voltage (kV), a tube current (mA), and/or the like) according to the selection by the operator, and sends the radiation generation apparatus control signal to the radiation generation apparatus 300 via the communication control unit 401.

After a radiation exposure preparation of the radiation generation apparatus 300 and a radiation detection preparation of the radiation imaging apparatus 100 are completed, when the operator presses a fluoroscopic imaging switch of the radiation generation apparatus operation UI 302, the radiation generation apparatus 300 starts emitting of radiation from the radiation source 301. When the radiation imaging apparatus 100 receives a radiation irradiation start signal via, for example, a dedicated signal line between the radiation generation apparatus 300 and the radiation imaging apparatus 100, the radiation imaging apparatus 100 starts a radiation image acquisition operation.

In step S201, the control unit 101 controls the radiation image acquisition unit 102 to acquire, from the radiation detection unit 200, a radiation image formed by the radiation emitted from the radiation source 301.

In next step S202, the control unit 101 checks whether irradiation field change information issued by the control unit 400 has arrived at the communication unit 112. In a case where the irradiation field change information has not arrived, the processing flow proceeds to step S203.

In step S203, the external control signal generation unit 103 performs brightness information (N) calculation 104 for the radiation image (image data) acquired by the radiation image acquisition unit 102. In the brightness information (N) calculation 104, the brightness information is calculated for the inside of the ROI 203 shown in FIG. 4A which has been set according to a radiation imaging apparatus control signal received by the communication unit 112 in advance before the start of the fluoroscopic imaging. The brightness information is, for example, the pixel average value in the ROI. When the brightness information is calculated based on the ROI (the region of interest) as in the present embodiment, the ROI corresponds to irradiation information indicating the irradiation area or irradiation position of the radiation emitted by the radiation generation apparatus and incident on the ROI 203. That is, the ROI is determined in relation to the irradiation area or irradiation position of the radiation emitted by the radiation generation apparatus, or the irradiation area or irradiation position of the radiation emitted by the radiation generation apparatus is determined by setting the ROI. Thus, the ROI is a parameter related to the irradiation area or irradiation position of radiation emitted by the radiation generation apparatus 300 and incident on a region of the radiation detection unit 200, and therefore the pixel average value in the ROI corresponds to irradiation information.

Next, in step S204, the external control signal generation unit 103 confirms whether the brightness information (S) 110 exists in the storage unit 108. Since the brightness information (S) 110 is information generated when an irradiation field reduction is detected, it may not exist in step S204. In a case where it does not exist, the processing flow proceeds to step S205. Information regarding the irradiation field reduction, such as the detection result of the irradiation field reduction is information related to the calculation of brightness information (S) as described above, and thus it is one type of irradiation information.

In step S205, the external control signal generation unit 103 confirms whether or not brightness information (N-1) 109 exists in the storage unit 108. Since the brightness information (N-1) 109 is information that holds the brightness information calculated by the external control signal generation unit 103, it does not exist at the timing when the fluoroscopic imaging is started. In a case where the brightness information (N-1) 109 does not exist, the processing flow proceeds to step S206.

In step S206, the external control signal generation unit 103 performs irradiation condition determination 106 based on the brightness information (N) calculated in step S203 and feeds back the irradiation condition information to the radiation generation apparatus 300. Note that the feedback to the radiation generation apparatus 300 may be performed via a dedicated signal line between the radiation generation apparatus 300 and the radiation imaging apparatus 100. The radiation generation apparatus 300 adjusts the radiation output according to the feedback information.

In next step S207, the external control signal generation unit 103 updates and saves the brightness information (N-1) 109 in the storage unit 108 with the brightness information (N) calculated in step S203.

Thereafter, the processing flow proceeds to step S208, in which the control unit 101 in the radiation imaging apparatus 100 determines whether to continue the fluoroscopic imaging. In this determination, the control unit 101 determines whether or not there is a fluoroscopic imaging continuation signal generated according to the state of the fluoroscopic imaging switch of the radiation generation apparatus UI 302 by using a dedicated signal line between the radiation generation apparatus 300 and the radiation imaging apparatus 100. As a result, if it is determined not to continue the fluoroscopic imaging, the external control signal generation unit 103 clears the data of the brightness information (N-1) 109 and the brightness information (S) 110 held in the storage unit 108, and ends the fluoroscopic imaging. In a case where it is determined to continue the fluoroscopic imaging, the processing flow returns again to step S201, and the control unit 101 controls the radiation image acquisition unit 102 to acquire, from the radiation detection unit 200, a radiation image formed by the radiation emitted from the radiation source 301.

After a further radiation image is acquired in step S201, if it is determined in S202 that irradiation field change information has not arrived, the processing flow proceeds to steps S203, S204, and S205. In step S205, since the brightness information (N-1) 109 was saved in the storage unit 108 when the first radiation image was acquired, the processing flow proceeds to step S210.

In step S210, the external control signal generation unit 103 performs irradiation field reduction detection 105. In the irradiation field reduction detection 105, the fluctuation between the brightness information (N) and the brightness information (N-1) 109 held in the storage unit 108 is calculated, and it is determined whether the fluctuation is larger than a first threshold value. Note that the fluctuation is given, for example, by the difference between the brightness information (N) and the brightness information (N-1) 109, that is, the difference in brightness information between adjacent frames. In case where the fluctuation is not larger than the first threshold value, the processing flow proceeds to step S206. As described above, when no irradiation field reduction occurs, steps S201, S202, S203, S204, S205, S210, S206, S207, and S208 are performed repeatedly for the second and subsequent frames. The above-described period during which the irradiation field reduction does not occur corresponds to the period from 0 to t1 in FIG. 3.

Hereinafter, the operation is further described below also referring to FIG. 4, for a case where when the irradiation condition is stabilized by ABC in a period from t1 to t2 in FIG. 3, an irradiation field reduction occurs, and irradiation field change information, which is one piece of irradiation information associated with the occurrence of the irradiation field reduction, has not arrived from the control apparatus 400. At t1, a radiation image is acquired in step S201 and then when it is checked in step S202 whether or not irradiation field change information has arrived, it is determined in this specific case that irradiation field change information has not arrived, and thus the processing flow proceeds to step S203. In step S203, the brightness information (N) is calculated. The brightness information (N) calculated in this step S203 is performed in a situation in which the radiation irradiation area has been changed as shown in FIG. 4B and, as a result thereof, the ROI 203 includes the region 205 that is not irradiated with radiation. Therefore, the brightness information (N) calculated here is greatly different from the brightness information (N-1).

Thereafter, in step S204, it is confirmed that brightness information (S) does not exist, and the processing flow proceeds to step S205. In step S205, since there is, in the storage unit 108, brightness information (N-1) 109 which was calculated when the image of the previous frame was acquired, the processing flow proceeds to step S210.

In step S210, the external control signal generation unit 103 calculates the difference between the brightness information (N) and the brightness information (N-1) 109 held in the storage unit 108. In a case where it is determined that the calculated difference is greater than the first threshold value, the processing flow proceeds to step S211.

In step S211, the external control signal generation unit 103 generates brightness information (S) 110 as data obtained by duplicating the brightness information (N-1) 109 held in the storage unit 108. Although not shown in FIGS. 2A and 2B, at this timing, the external control signal generation unit 103 holds the information of the internal clock 113 as time information 111 in the storage unit 108.

Thereafter, in step S212, the external control signal generation unit 103 performs irradiation condition determination 106 based on the data of the brightness information (S) 110 generated in step S211 and feeds back the irradiation condition information to the radiation generation apparatus 300. Note that it is assumed that the same brightness information result in determining the same irradiation condition.

After that, in step S207, the brightness information (N-1) 109 is updated. Thereafter, when it is determined in step S208 to continue the fluoroscopic imaging, a radiation image is again acquired in step S201.

Thereafter, when it is checked in step S202 whether irradiation field change information has arrived, it is determined in this specific case that irradiation field change information has not arrived, and thus the processing flow proceeds to step S203. In step S203, brightness information (N) is calculated, and then the processing flow proceeds to step S204.

In step S204, the external control signal generation unit 103 confirms that data of the brightness information (S) 110 exists in the storage unit 108, and the processing flow proceeds to step S213.

In step S213, the external control signal generation unit 103 calculates the difference between the brightness information (N) calculated in step S203 and the brightness information (S) 110 existing in the storage unit 108. In a case where it is determined that the calculated difference is greater than the first threshold value, the processing flow proceeds to step S214.

In step S214, the external control signal generation unit 103 acquires the information of the internal clock 113 and calculates the elapsed time from the time information 111 stored in the storage unit 108. That is, the elapsed time since the recalculation of the brightness information is calculated. In a case where the elapsed time is not longer than a predetermined time (for example, 10 msec), that is, in a case where the predetermined time has not elapsed since the recalculation of the brightness information, the processing flow proceeds to step S215.

Figure 6:
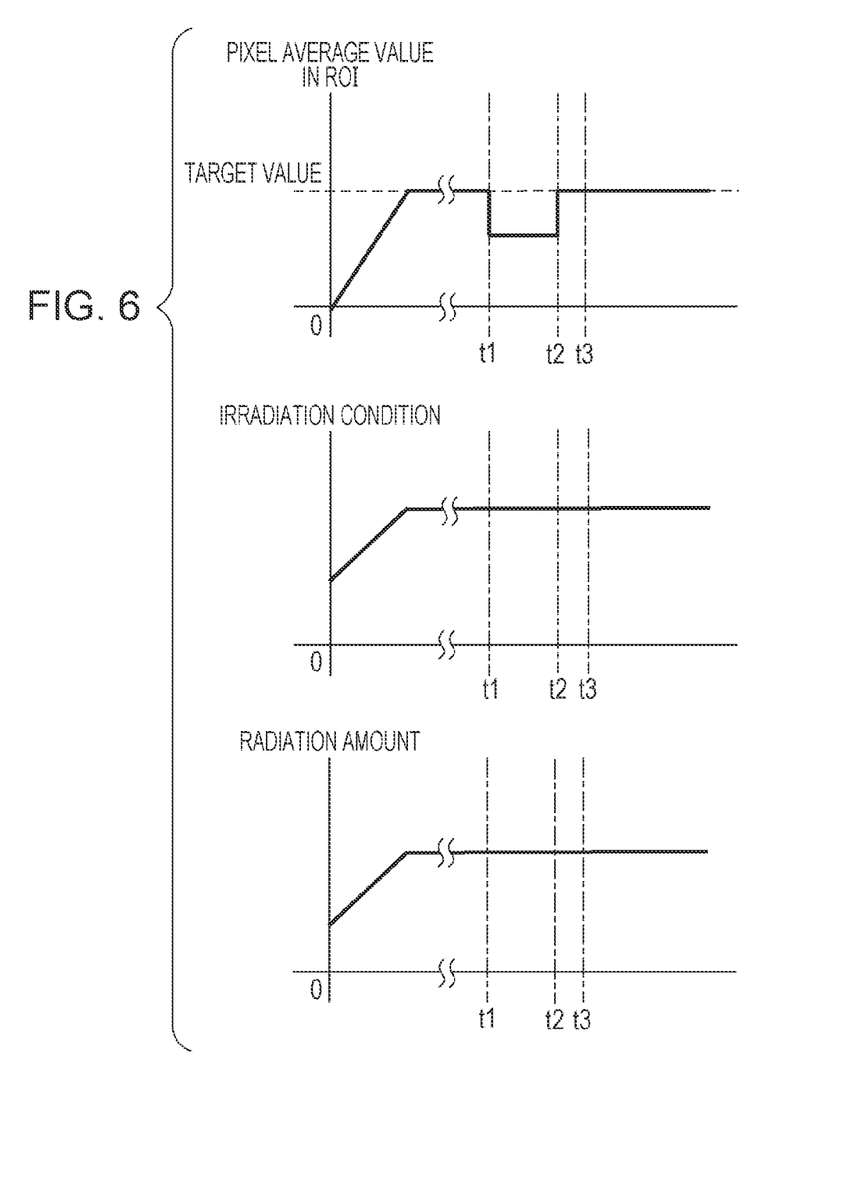
FIG. 6 is a diagram showing temporal changes in a pixel average value in a ROI, an irradiation condition, and an amount of radiation which occur, in a radiation imaging system according to an embodiment of the present disclosure, when an irradiation field reduction occurs in the middle of fluoroscopic imaging or continuous imaging, and a delay occurs in a notification of irradiation field change information.

In step S215, the process is performed in a similar manner to the process in step S212, and the processing flow proceeds to step S207 and then to step S208. In a period from t1 to t2 in FIG. 3, steps S201, S202, S203, S204, S213, S214, S215, S207 and S208 are performed repeatedly. Note that it is assumed that the period time from t1 to t2 in FIG. 3 is not longer than a predetermined value, for example, 10 msec. As a result, the irradiation condition between t1 and t2 becomes constant as shown in FIG. 6. That is, neither an increase nor a reduction occurs in the amount of radiation.

Next, processing after t2 is described below.

A radiation image is acquired in step S201 and then it is checked in step S202 whether or not irradiation field change information has arrived. It is determined in this specific case that irradiation field change information has arrived, and thus the processing flow proceeds to step S216.

In step S216, the external control signal generation unit 103 performs the ROI change 107 so as to change the ROI from ROI 203 shown in FIG. 5A to ROI 206 as shown in FIG. 5B according to the irradiation field change information received from the radiation imaging apparatus control unit 402 via the communication unit 112.

Next, in step S217, the external control signal generation unit 103 calculates brightness information (N) in the new ROI 206 obtained as a result of the change performed in step S216. After that, the brightness information in the new ROI 206 is calculated until the ROI change 107 is performed again. Note that, as described above with reference to step S216, the ROI change information is used in brightness calculation, and thus the ROI change information can be one piece of irradiation information.

Thereafter, in step S218, the external control signal generation unit 103 clears the brightness information (S) existing in the storage unit 108. In next step S219, as in step S206, the external control signal generation unit 103 performs the irradiation condition determination 106 based on the brightness information (N) and feeds back the irradiation condition information to the radiation generation apparatus 300.

By performing the processing in the above-described manner, it is possible to maintain the constant irradiation condition even in the period from t1 to t2 in which there is a delay in the notification of the irradiation field change information as shown in FIG. 6, and thus the amount of radiation can be kept constant. This can prevent a patient from being exposed to ineffective radiation. Furthermore, when the notification of the irradiation field change information arrives at a delayed timing at t3, ABC can be performed accurately even after t3.

In a case where the period from t1 to t2 is longer than, for example, 10 msec, that is, in a case where the notification of the irradiation field change information does not arrive even when the elapsed time since the generation of the brightness information (S) 110 exceeds 10 msec, the processing flow proceeds from step S214 to step S220. In this case, it is determined that the irradiation condition has been changed by an operator not as a result of an occurrence of an irradiation field reduction, and the external control signal generation unit 103 clears the brightness information (S) 110 existing in the storage unit 108. In next step S221, as in step S206, the external control signal generation unit 103 performs the irradiation condition determination 106 based on the brightness information (N) and feeds back the irradiation condition information to the radiation generation apparatus 300.

Also in a case where it is determined in S213 that the calculated fluctuation of the brightness information does not exceed the first threshold value during the period from t1 to t2, the processing flow proceeds to step S220 and then step S221.

Note that the fluctuation of the brightness information calculated in steps S210 and S213 may be given by, for example, a differential value of the brightness information continuously measured from the start of the fluoroscopic imaging. In this case, in step S207, the brightness information (N-1) 109 is seriously stored and kept in the storage unit 108 instead of being updated. Then, in step S213, the differential value of the brightness information may be calculated from the plurality of pieces of brightness information stored in the storage unit 108, and an irradiation field reduction may be detected based on whether the calculated differential value is greater than the first threshold value.

Figure 2B:
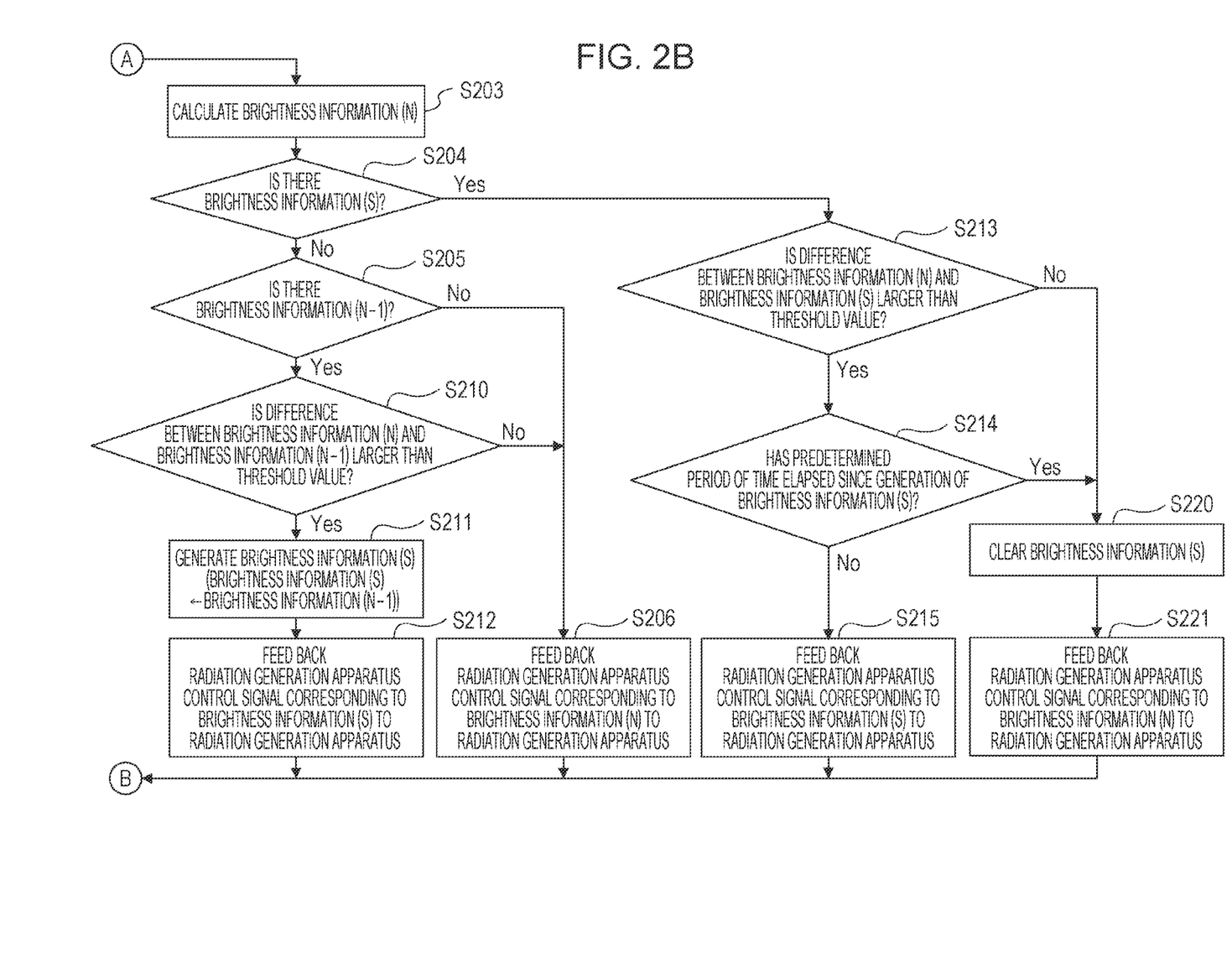
Figure 7A:
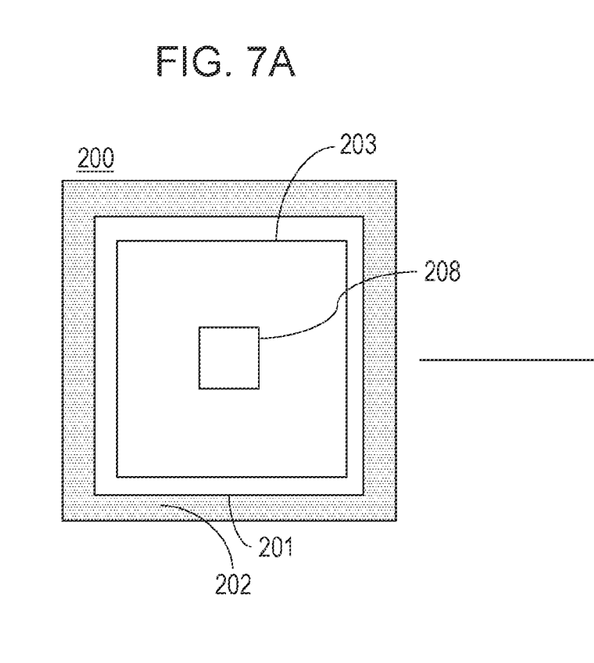
FIGS. 7A and 7B are diagrams illustrating a radiation detection unit which is similar to the radiation detection unit shown n FIGS. 4A and 4B but different in that a small area is defined in the radiation detection unit.
Figure 7B:
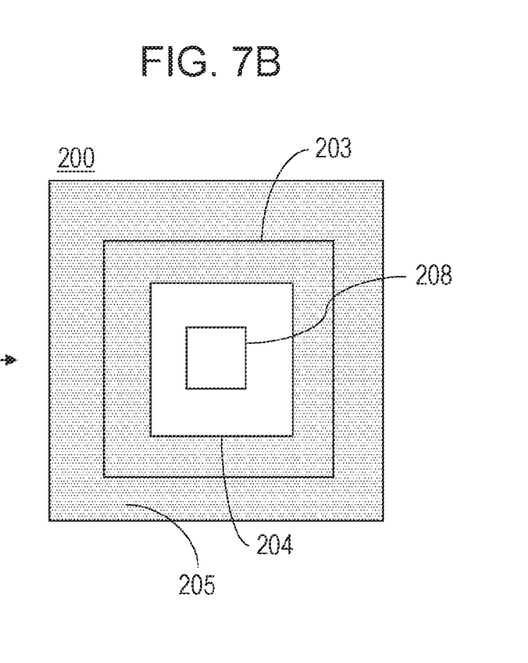

In step S210 in FIG. 2B, an irradiation field reduction is detected by determining whether or not the fluctuation of the brightness information in the ROI exceeds the first threshold value, the irradiation field reduction may be detected according to another determination criterion. For example, as shown in FIGS. 7A and 7B, a small area 208 may be defined in the ROI 203, and an occurrence of an irradiation field reduction may be detected based on a fluctuation of the pixel average value in the small area 208. In FIGS. 7A and 7B, 200 denotes the radiation detection unit, 201 and 204 each denote a radiation irradiation region, and 202 and 205 each denote a region which is not irradiated with radiation.

Figure 8:
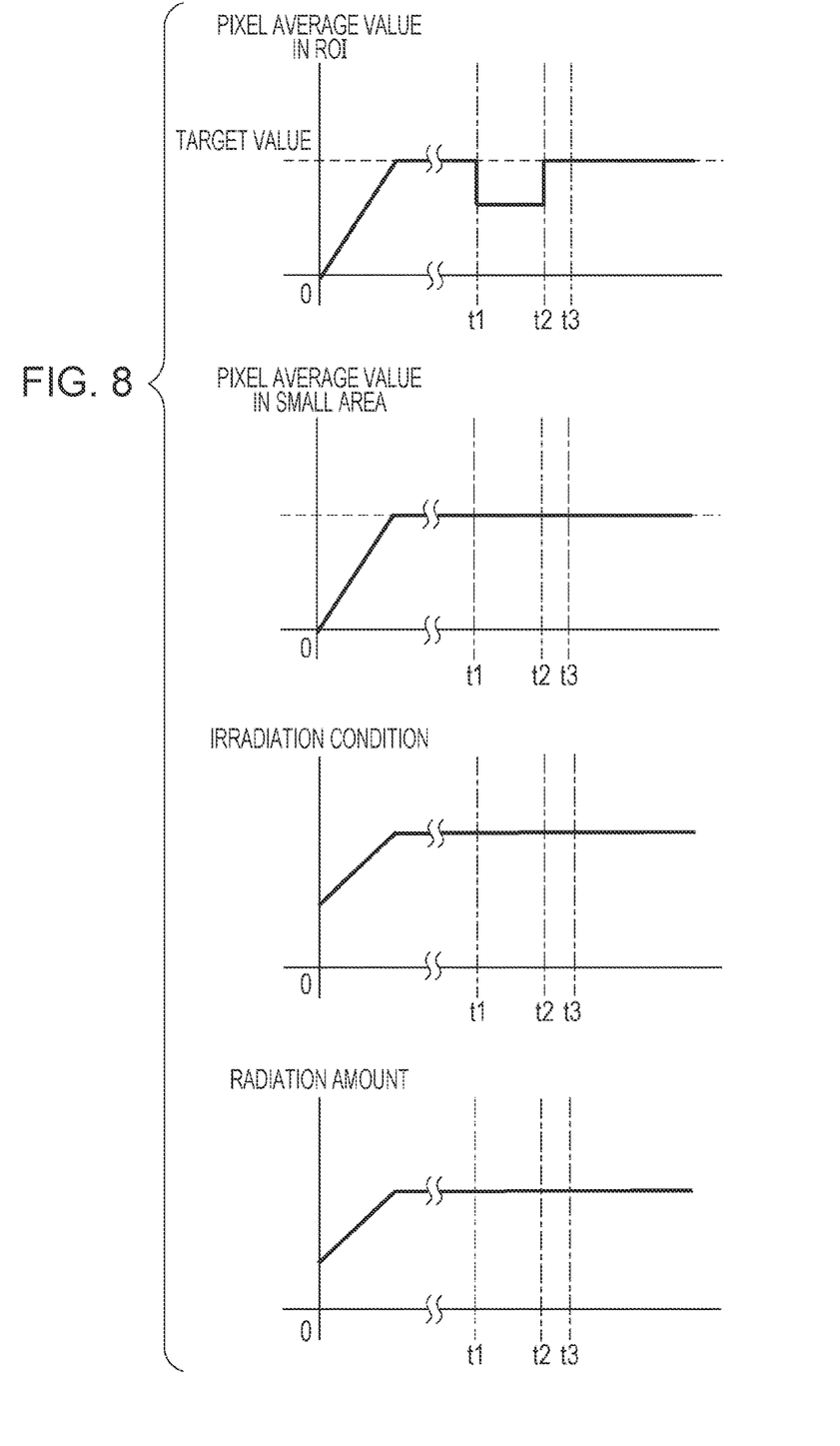
FIG. 8 is a diagram showing temporal changes in a pixel average value in a ROI, a pixel average value in a small area, an irradiation condition, and an amount of radiation which occur in a configuration in which the small area is defined in the radiation detection unit.

In this case, if an irradiation field reduction occurs at t1 as shown in FIG. 8, and if irradiation field change information thereof has not arrived at the radiation imaging unit, the average pixel value in the ROI 203 decreases but the average pixel value of the small area 208 does not fluctuate because the small area 208 is within the irradiation field. In step S210, an irradiation field reduction detection is performed such that when a fluctuation of the pixel average value in the ROI 203 larger than the first threshold value occurs and a fluctuation of the pixel average value in the small area 208 is smaller than the second threshold value, it is determined that an irradiation field reduction has occurred. In order to realize this, although not shown in the figure, it is necessary to separately calculate the small area brightness information (N) in steps S203 and S217. In step S207, it is necessary to update and store the small area brightness information (N-1) in the storage unit 108. In step S216, after a notification of irradiation field change information is received in step S202, a further operation may be performed to change the small area 208.

The first threshold value and the second threshold value used in steps S210 and S213 may be variable according to the radiation imaging apparatus control signal transmitted from the radiation imaging apparatus control unit 402 before the fluoroscopic imaging is started. For example, the first threshold value and the second threshold value may be determined according to each imaging mode number, which is one of the radiation imaging apparatus control signals, or according to the frame rate. In this case, for example, when the fluoroscopic imaging is performed at a high frame rate, the first threshold value and the second threshold value respectively are set to be lower than the first threshold value and the second threshold value for the fluoroscopic imaging in a low frame rate.

In the foregoing description, a novel solution to the case of irradiation field reduction is discussed. However, a similar procedure may be applied when an irradiation position change occurs as a result of a change in the relative position between the radiation source 301 and the radiation imaging apparatus 100 shown in FIG. 1, if a delay occurs in the notification of irradiation position change information. The technique disclosed in the present disclosure may be used in the cases of irradiation field reduction, irradiation field increase, or irradiation position change (i.e., a change in radiation irradiation area or in irradiation position of the pixel unit irradiated by the radiation generation apparatus).

As described above, according to the present disclosure, in the radiation imaging apparatus, a reduction in ABC accuracy can be suppressed when the irradiation field is reduced by the collimator unit in the middle of radiation imaging, even if a delay occurs in a notification of irradiation field change information sent in response to the occurrence of the irradiation field reduction.

While the present disclosure has been described with reference to exemplary embodiments, it is to be understood that the claimed subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2021-192187 filed Nov. 26, 2021, which is hereby incorporated by reference herein in its entirety.

What is claimed is:

1. A radiation imaging apparatus comprising:
a pixel unit including a plurality of pixels and configured to generate image data in response to receiving irradiation of radiation from a radiation generation apparatus;
at least one processor; and
a memory coupled to the at least one processor, the memory having instructions that, when executed by the at least processor, perform to:
acquire irradiation information regarding a radiation irradiation area or an irradiation position of the pixel unit irradiated by the radiation generation apparatus;
calculate brightness information of each of successive pieces of image data obtained by operating the pixel unit at a predetermined frame rate based on each of the successive pieces of image data and the irradiation information;
store a timing of calculating the brightness information;
generate irradiation condition information regarding an irradiation condition of the radiation generation apparatus based on the brightness information;
transmit the irradiation condition information to the radiation generation apparatus
recalculate the brightness information based on the irradiation information when a fluctuation of the brightness information exceeds a threshold value; and
transmit irradiation condition information based on a period of time elapsed between a timing of calculating the recalculated brightness information and a timing of calculating brightness information calculated immediately before.

2. The radiation imaging apparatus according to claim 1, wherein the brightness information is calculated using a region of interest of the pixel unit.

3. The radiation imaging apparatus according to claim 2, wherein the region of interest includes a first region of interest and a second region of interest that is smaller than the first region of interest and is included in the first region of interest, and in a case where a fluctuation of second brightness information calculated using the second region of interest is smaller than a threshold value, the irradiation condition information is not transmitted to the radiation generation apparatus.

4. The radiation imaging apparatus according to claim 1, wherein the fluctuation is defined by a difference between pieces of brightness information based on continuous image data.

5. The radiation imaging apparatus according to claim 1, wherein the fluctuation is defined by a differential value of brightness information based on continuous image data.

6. The radiation imaging apparatus according to claim 1, wherein the threshold value is set according to the frame rate.

* * * * *